(12) United States Patent
Laganier et al.

(10) Patent No.: US 9,491,036 B2
(45) Date of Patent: Nov. 8, 2016

(54) METHOD AND APPARATUS FOR FACILITATING PREFIX ALLOCATION AND ADVERTISEMENT OR DELEGATION

(75) Inventors: Julien H. Laganier, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 13/049,589

(22) Filed: Mar. 16, 2011

(65) Prior Publication Data

US 2011/0228734 A1 Sep. 22, 2011

Related U.S. Application Data

(60) Provisional application No. 61/315,356, filed on Mar. 18, 2010.

(51) Int. Cl.
*H04L 29/12* (2006.01)
*H04W 8/26* (2009.01)

(52) U.S. Cl.
CPC ..... *H04L 29/12283* (2013.01); *H04L 61/2061* (2013.01); *H04L 29/12933* (2013.01); *H04L 61/6068* (2013.01); *H04W 8/26* (2013.01)

(58) Field of Classification Search
None
See application file for complete search history.

(56) References Cited

U.S. PATENT DOCUMENTS

| | | | | |
|---|---|---|---|---|
| 8,140,710 | B2* | 3/2012 | Ikeda | 709/250 |
| 8,681,739 | B1* | 3/2014 | Zhao et al. | 370/331 |
| 8,788,826 | B1* | 7/2014 | Zhao et al. | 713/171 |
| 2010/0080228 | A1* | 4/2010 | Kwapniewski | H04L 45/00 370/392 |
| 2010/0238811 | A1* | 9/2010 | Rune | H04L 12/66 370/248 |
| 2011/0110374 | A1 | 5/2011 | Boucadair et al. | |
| 2011/0216743 | A1* | 9/2011 | Bachmann et al. | 370/331 |

FOREIGN PATENT DOCUMENTS

| | | |
|---|---|---|
| CN | 101179603 A | 5/2008 |
| JP | 2004318582 A | 11/2004 |
| JP | 2007036304 A | 2/2007 |
| JP | 2010502035 A | 1/2010 |
| JP | 2011526755 A | 10/2011 |

(Continued)

OTHER PUBLICATIONS

Baccelli (ED) Inria E, "Address Auto configuration for MANET: Terminology and Problem Statement; draft-i etf-autoconf-statement-04.txt", IETF Standard-Working-Draft, Internet Engineering Task Force, IETF, CH, vol. autoconf, No. 4, Feb. 25, 2008 (Feb. 25, 2008).

(Continued)

*Primary Examiner* — Tito Pham
(74) *Attorney, Agent, or Firm* — Ke Liu

(57) ABSTRACT

An apparatus and method for facilitating prefix allocation and advertisement or delegation in a wireless communication system, including receiving a signal from a client to indicate that the client will function as a router; and prompting a server to not allocate a prefix to a link between the server and the client and to not advertise said prefix to the client. In one aspect, the apparatus and method further includes allocating a first prefix to a user equipment (UE), receiving an indication that the UE is a router; and either a) reserving a second prefix for the UE wherein the second prefix is shorter than the first prefix; or b) calculating the second prefix for the UE wherein the second prefix includes a portion of the first prefix.

26 Claims, 14 Drawing Sheets

(56) References Cited

FOREIGN PATENT DOCUMENTS

| WO | 2008023850 A1 | 2/2008 |
| WO | 2010004156 A1 | 1/2010 |
| WO | 2010016241 A1 | 2/2010 |

OTHER PUBLICATIONS

International Search Report and Written Opinion—PCT/US2011/029089, ISA/EPO—Jun. 15, 2011.

Nathan Lutchansky Cornell University: IPv6 Router Advertisement Prefix Delegation Option; draft-lutchann-ipv6-delegate-option-00.txt, IETF Standard-Working-Draft, Internet Engineering Task Force, IETF, CH, Feb. 1, 2002 (Feb. 1, 2002), XP015004261, ISSN: 0000-0004.

Paakkanen P et al., "IPv6 prefix delegation-based addressing solution for a mobile personal area network", Multimedia Signal Processing, 2002 IEEE Workshop on Dec. 9-11, 2002, Piscataway, NJ, USA, IEEE, May 19, 2003 (May 19, 2003), pp. 819-824, XP010642470, ISBN: 978-0-7803-7713-4.

Troan R Droms CISCO Systems O: "IPv6 Prefix Options for Dynamic Host Configuration Protocol (DHCP) version 6; rfc3633.txt", IETF Standard, Internet Engineering Task Force, IETF, CH, Dec. 1, 2003 (Dec. 1, 2003), XP015009415, ISSN: 0000-0003.

\* cited by examiner

METHOD AND APPARATUS FOR FACILITATING PREFIX ALLOCATION AND ADVERTISEMENT OR DELEGATION

CLAIM OF PRIORITY UNDER 35 U.S.C. §119

The present Application for Patent claims priority to Provisional Application No. 61/315,356 entitled "Method and Apparatus for Facilitating Prefix Allocation and Advertisement or Delegation" filed Mar. 18, 2010, and assigned to the assignee hereof and hereby expressly incorporated by reference herein.

FIELD

This disclosure relates generally to apparatus and methods for wireless communication systems. More particularly, the disclosure relates to facilitating prefix allocation and advertisement or delegation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Disclosed is an apparatus and method for facilitating prefix allocation and advertisement or delegation, for example, using a dedicated evolved packet system (EPS) bearer context to facilitate prefix allocation and advertisement or delegation to a node acting as a host or a router. According to one aspect, a method for facilitating prefix allocation and advertisement or delegation in a wireless communication system, including receiving a signal from a client to indicate the client will function as a router; and prompting a server to not allocate a prefix to a link between the server and the client and to not advertise said prefix to the client.

According to another aspect, a method for facilitating prefix allocation and advertisement or delegation in a wireless communication system, including allocating a first prefix to a user equipment (UE); receiving an indication that the UE is a router; and reserving a second prefix for the UE, wherein the second prefix is shorter than the first prefix.

According to another aspect, a method for facilitating prefix allocation and advertisement or delegation in a wireless communication system, including allocating a first prefix to a user equipment (UE); receiving an indication that the UE is a router; and calculating a second prefix for the UE, wherein the second prefix includes a portion of the first prefix.

According to another aspect, an apparatus for facilitating prefix allocation and advertisement or delegation in a wireless communication system, including means for receiving a signal from a client to indicate the client will function as a router; and means for prompting a server to not allocate a prefix to a link between the server and the client and to not advertise said prefix to the client.

According to another aspect, an apparatus for facilitating prefix allocation and advertisement or delegation in a wireless communication system, including means for allocating a first prefix to a user equipment (UE); means for receiving an indication that the UE is a router; and means for reserving a second prefix for the UE, wherein the second prefix is shorter than the first prefix.

According to another aspect, an apparatus for facilitating prefix allocation and advertisement or delegation in a wireless communication system, including means for allocating a first prefix to a user equipment (UE); means for receiving an indication that the UE is a router; and means for calculating a second prefix for the UE, wherein the second prefix includes a portion of the first prefix.

According to another aspect, an apparatus for facilitating prefix allocation and advertisement or delegation in a wireless communication system, including an antenna for receiving a signal from a client to indicate the client will function as a router; and a processor for prompting a server to not allocate a prefix to a link between the server and the client and to not advertise said prefix to the client.

According to another aspect, an apparatus for facilitating prefix allocation and advertisement or delegation in a wireless communication system, including a gateway for allocating a first prefix to a user equipment (UE), for receiving an indication that the UE is a router; and for performing one of the following: reserving a second prefix for the UE, wherein the second prefix is shorter than the first prefix; or calculating the second prefix for the UE, wherein the second prefix includes a portion of the first prefix.

According to another aspect, a computer program product, including a computer-readable medium including: codes for causing a computer to receive a signal from a client to indicate the client will function as a router; and codes for causing the computer to prompt a server to not allocate a prefix to a link between the server and the client and to not advertise said prefix to the client.

According to another aspect, a computer program product, including a computer-readable medium including codes for causing a computer to allocate a first prefix to a user equipment (UE), to receive an indication that the UE is a router; and to perform one of the following: reserve a second prefix for the UE, wherein the second prefix is shorter than the first prefix; or calculate the second prefix for the UE, wherein the second prefix includes a portion of the first prefix.

Advantages of the present disclosure may include minimizing the number of bits in a network address prefix.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
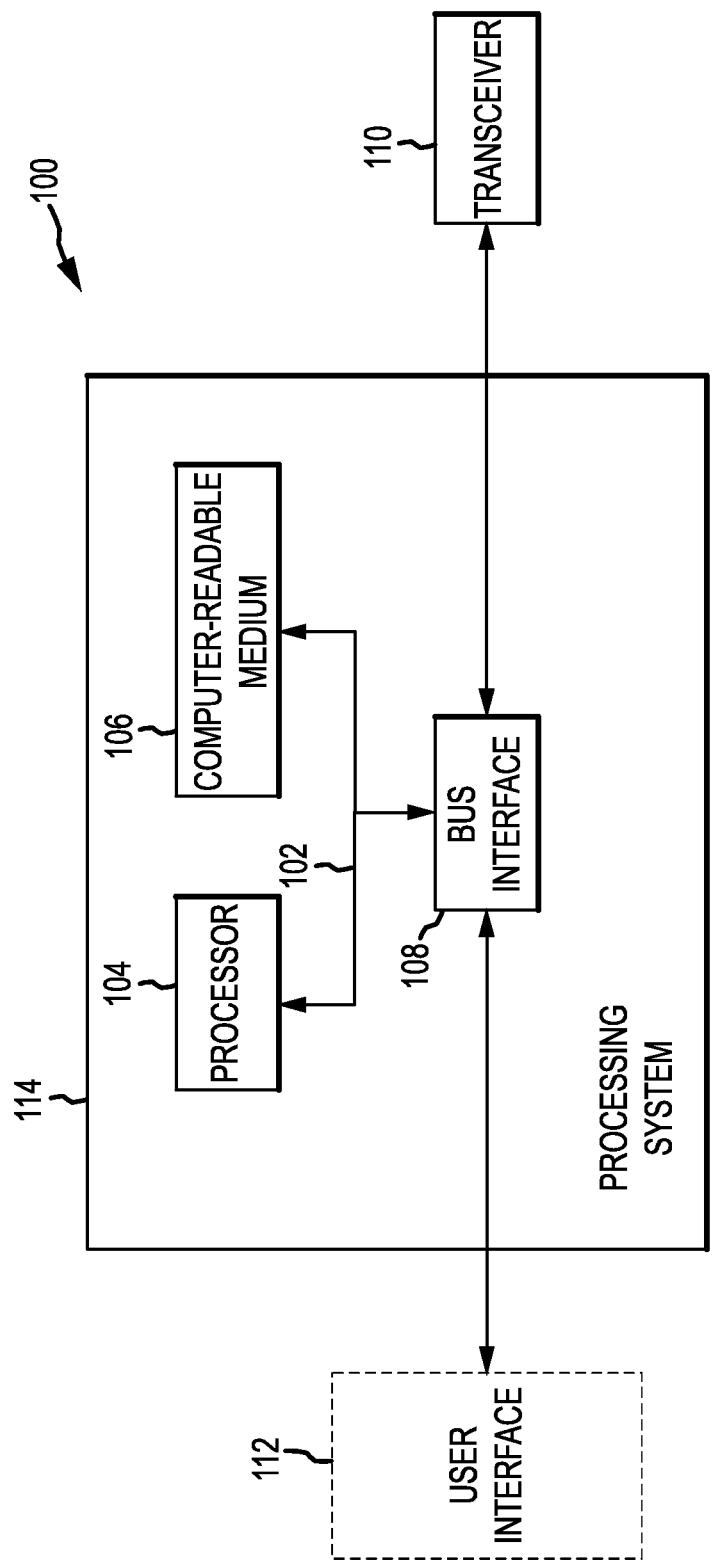
FIG. 1 illustrates a conceptual diagram illustrating an example of a hardware implementation for an apparatus employing a processing system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates a conceptual diagram illustrating an example of a hardware implementation for an apparatus employing a processing system. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104) and computer-readable media (represented generally by the computer-readable medium 106). The bus 102 may also link various other circuits such as timing sources, peripherals, voltage regulators, and power management circuits, etc. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick, etc.) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
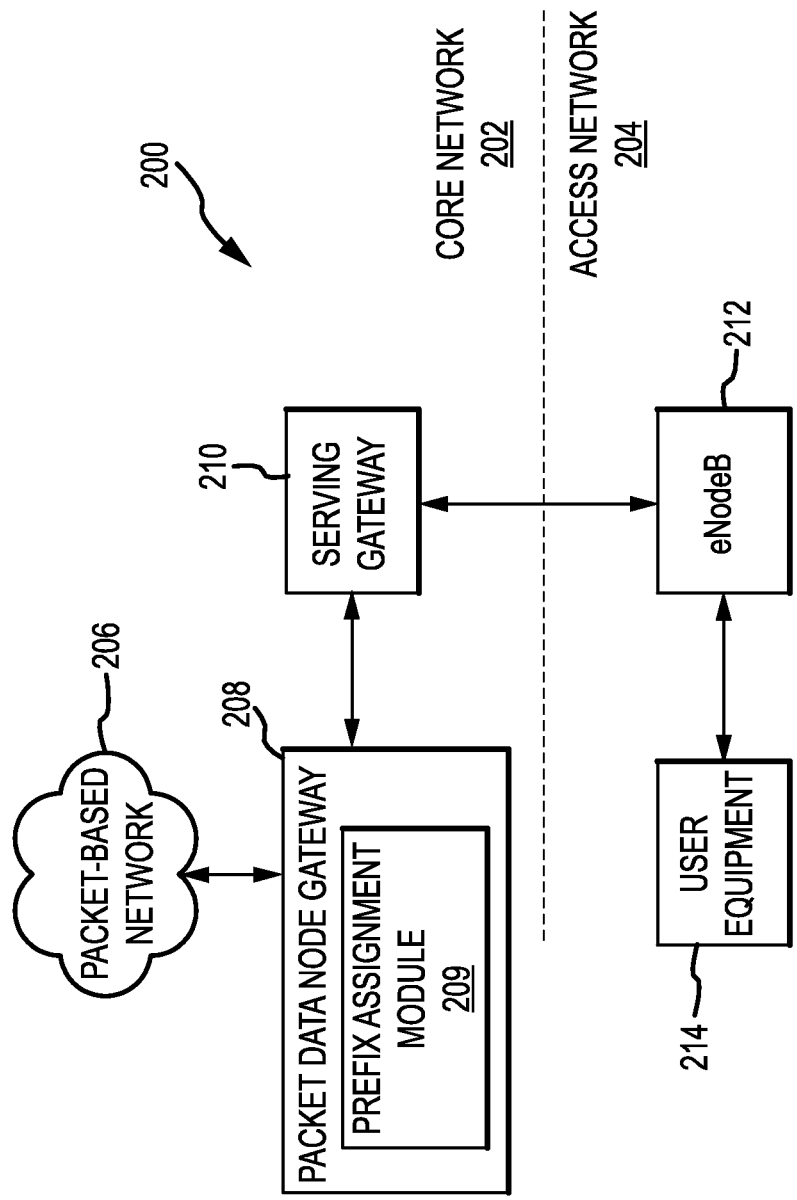
FIG. 2 illustrates a conceptual diagram illustrating an example of a network architecture.

FIG. 2 illustrates a conceptual diagram illustrating an example of a network architecture. An example of a telecommunications system employing various apparatus will now be presented with reference to a LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

In one aspect of network 200, nodes (e.g. PDN gateway 208, UE 214) acting as a point-to-point (PtP) client and PtP server are based on, for example, a IEEE 802.16/WiMax network (Subscriber station (SS), Mobile Station (MS), Mobile Node (MN) on one hand and Access Router (AR) on the other hand). Further nodes (e.g. PDN gateway 208, UE 214) acting as a point-to-point (PtP) client and PtP server are from a 3GPP2 based network. The nodes may be access terminal (AT) or user equipment (UE) depending whether it is HRPD (high rate packet data) or e-HRPD (evolved high rate packet data) on one hand. The nodes may be a packet data serving node (PDSN), a gateway GPRS support noted (GGSN) or a PDN gateway (PGW) depending whether it is HRPD or e-HRPD in the other hand. Both types of nodes may have the same constraint that a unique IPv6 prefix be allocated to the PtP Client. In one aspect, the PtP client may be a UE 214 and the PtP server may be a PDN gateway 208.

The access network 204 is shown with a single apparatus 212, which is commonly referred to as an evolved NodeB (eNodeB) in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus or UE 214. Examples of a mobile apparatus may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In one aspect, the mobile apparatus 214 may be operable to act as a leaf host or router in a point to point link. In such an aspect, a host may have a prefix allocated and advertised, while a router may have one or more prefixes allocated and delegated. Furthermore, a prefix may be allocated to the mobile apparatus 214 during an initial attachment, a requested packet data node (PDN) connectivity procedure, etc.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. A function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204. In one aspect, the PDN gateway 208 may include a prefix assignment module 209 which may be operable to allocate address prefixes to mobile apparatus 214 for use in a point-to-point link. In one such aspect, the prefix assignment module 209 may wait for the UE 214 to make a request prior to determining whether to assign (i.e., allocate) a prefix. In another aspect, the prefix assignment module 209 may allocate a common prefix which may be used by a host and/or modified by a router UE 214. In still another aspect, a prefix assignment module 209 may allocate a comparatively shorter prefix for a UE 214 acting as a router and may calculate additional prefixes for UEs 214 associated with a router UE 214.

Figure 3:
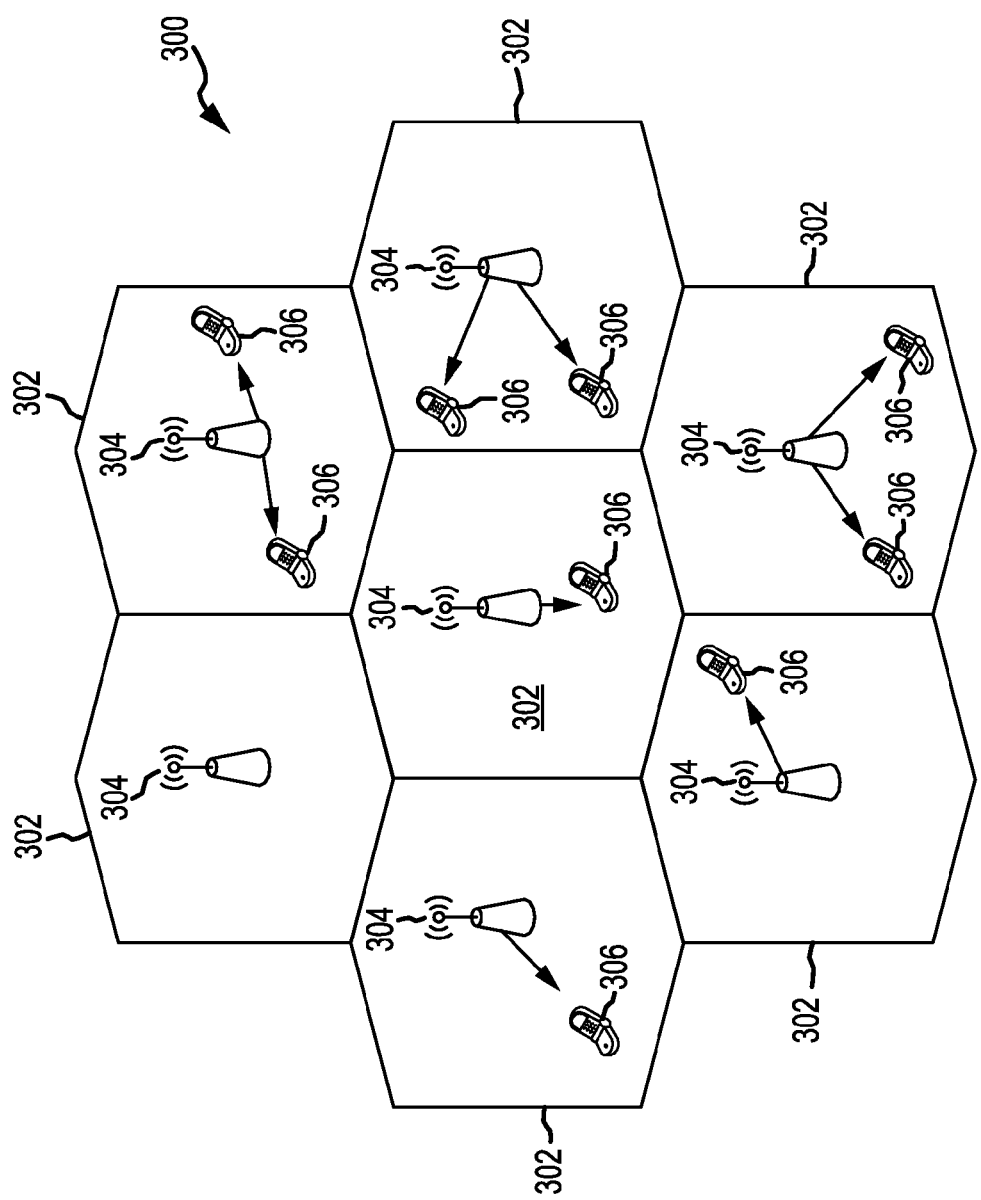
FIG. 3 illustrates a conceptual diagram illustrating an example of an access network.

FIG. 3 illustrates a conceptual diagram illustrating an example of an access network. An example of an access network in a LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. In one example, the use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network is described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a discrete Fourier transform (DFT)-spread OFDM signal to compensate for high peak-to-average power ratio (PAPR).

Figure 4:
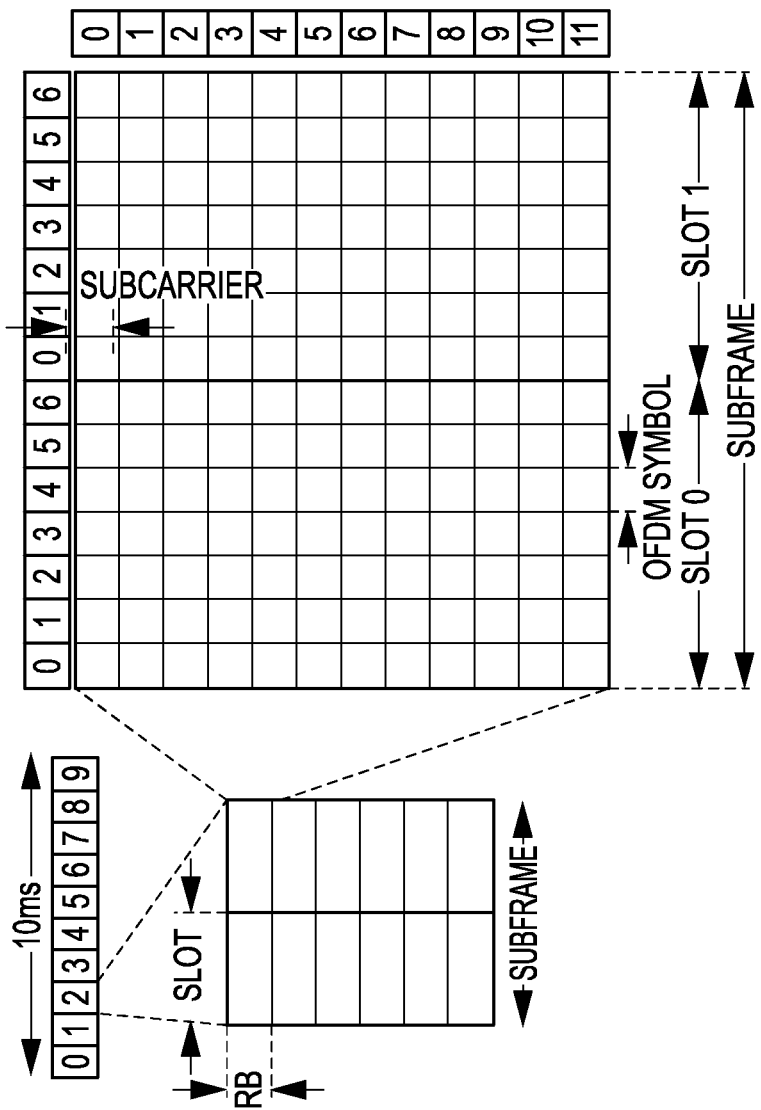
FIG. 4 illustrates a conceptual diagram illustrating an example of a frame structure for use in an access network.

Various frame structures may be used to support the DL and UL transmissions. FIG. 4 illustrates a conceptual diagram illustrating an example of a frame structure for use in an access network. An example of a DL frame structure is presented with reference to FIG. 4. However, as those skilled in the art will readily appreciate, the frame structure for any particular application may be different depending on any number of factors. In this example, a frame (of 10 ms duration) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

Figure 5:
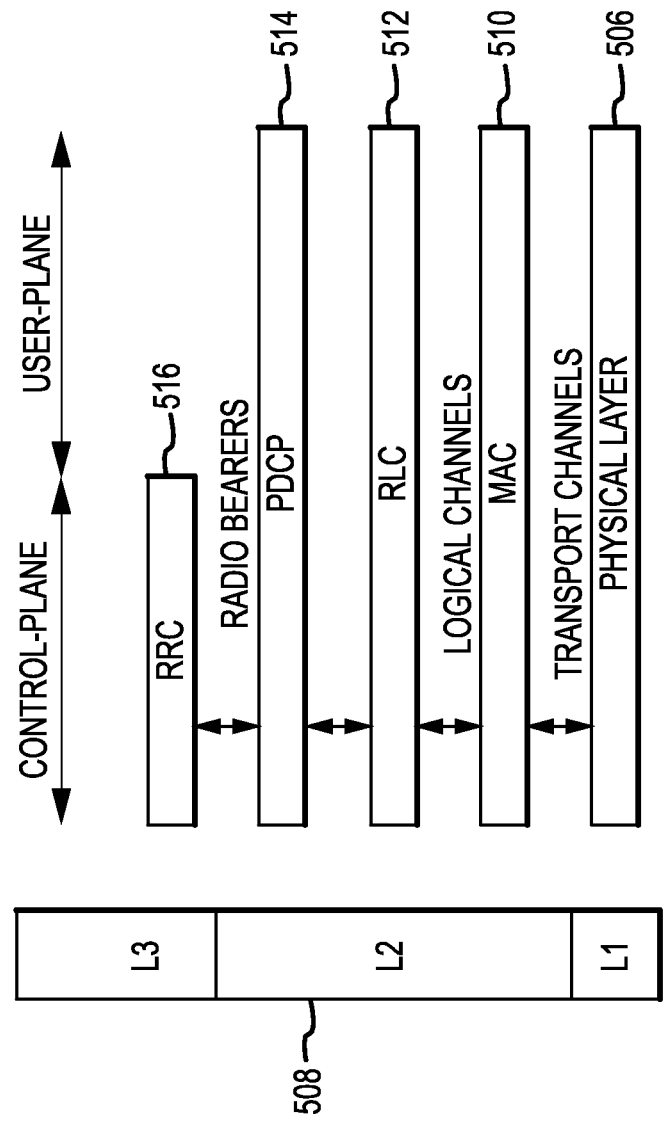
FIG. 5 illustrates a conceptual diagram illustrating an example of a radio protocol architecture for the user and control plane.

The radio protocol architecture may take on various forms depending on the particular application. FIG. 5 illustrates a conceptual diagram illustrating an example of a radio protocol architecture for the user and control plane. An example for an LTE system is presented with reference to FIG. 5. In one example, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In one aspect, in the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

In one aspect, a PDN gateway 208 may efficiently differentiate hosts based on layer 2 identifiers, such as GPRS (General Packet Radio Service) Tunneling Protocol tunnel endpoint identifiers (GTP TEID), or GRE (generic routing encapsulation) keys. In such an aspect, prefix assignment module 209 may build delegated prefixes based on layer 2 identifier and the gateway 208 may then forward traffic based on the layer 2 identifier embedded within an IPv6 address rather than by the IPv6 address itself.

In one aspect, the PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 may also be responsible for allocating the various radio resources (e.g., resource blocks) in one cell among the UEs. The MAC sublayer 510 may also be responsible for HARQ operations.

In another aspect, in the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
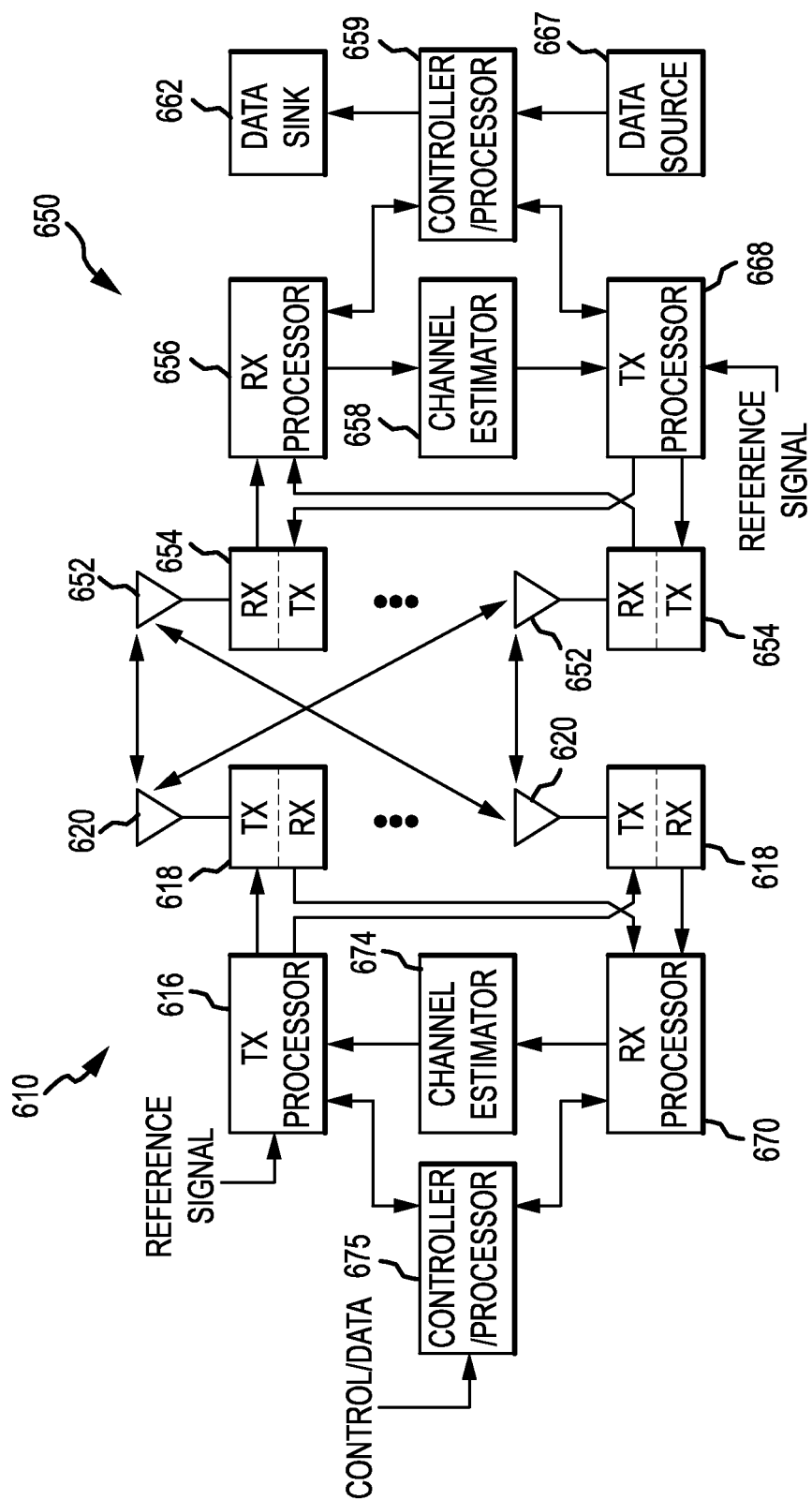
FIG. 6 illustrates a conceptual diagram illustrating an example of an eNodeB and UE in an access network.

FIG. 6 illustrates a conceptual diagram illustrating an example of an eNodeB and UE in an access network. FIG. 6 shows a network component 610 (e.g., eNodeB) in communication with a UE 650 in an access network. In the downlink (DL), upper layer packets from the core network are provided to a controller/processor 675. The controller/processor 675 implements the functionality of the L2 layer described earlier in connection with FIG. 5. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions may include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618 TX. Each transmitter 618 TX modulates an RF carrier with a respective spatial stream for transmission.

At the UE 650, each receiver 654 RX receives a signal through its respective antenna 652. Each receiver 654 RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, is recovered and demodulated by determining the most likely signal constellation points transmitted by the network component 610 (e.g., eNodeB). These soft decisions may be based on channel estimates computed by the channel estimator 658. The soft decisions are then decoded and deinterleaved to recover the data and control signals that were originally transmitted by the network component 610 (e.g., eNodeB) on the physical channel. The data and control signals are then provided to the controller/processor 659.

The controller/processor 659 implements the L2 layer described earlier in connection with FIG. 5. In the uplink (UL), the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink (UL), a data source 667 is used to provide upper layer packets to the controller/processor 659. The data source 667 represents all protocol layers above the L2 layer (L2). Similar to the functionality described in connection with the DL transmission by the network component 610 (e.g., eNodeB), the controller/processor 659 implements the L2 layer for the user plane and the control plane by providing header compression, ciphering, packet segmentation and reordering, and multiplexing between logical and transport channels based on radio resource allocations by the network component 610 (e.g., eNodeB). The controller/processor 659 is also responsible for HARQ operations, retransmission of lost packets, and signaling to the network component 610 (e.g., eNodeB).

Channel estimates derived by a channel estimator 658 from a reference signal or feedback transmitted by the network component 610 (e.g., eNodeB) may be used by the TX processor 668 to select the appropriate coding and modulation schemes, and to facilitate spatial processing. The spatial streams generated by the TX processor 668 are provided to different antenna 652 via separate transmitters 654 TX. Each transmitter 654 TX modulates an RF carrier with a respective spatial stream for transmission.

The UL transmission is processed at the network component 610 (e.g., eNodeB) in a manner similar to that described in connection with the receiver function at the UE 650. Each receiver 618 RX receives a signal through its respective antenna 620. Each receiver 618 RX recovers information modulated onto an RF carrier and provides the information to a RX processor 670. The RX processor 670 implements the L1 layer.

The controller/processor 659 implements the L2 layer described earlier in connection with FIG. 5. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection using an acknowledgement (ACK) and/or negative acknowledgement (NACK) protocol to support HARQ operations.

The processing system 100 described with respect to FIG. 1 includes the network component 610. In one aspect, the network component 610 may include a node B, an eNodeB, a PDN gateway, etc. In particular, the processing system 100 includes the TX processor 616 and the RX processor 670. In one configuration, the TX/RX processor is configured to receive a signal from a UE to indicate the UE will function as a router, and prompt a packet data node (PDN) gateway to not assign (i.e., not allocate) a prefix to a link between the UE and the PDN gateway and to not advertise said prefix to the UE.

Figure 7:
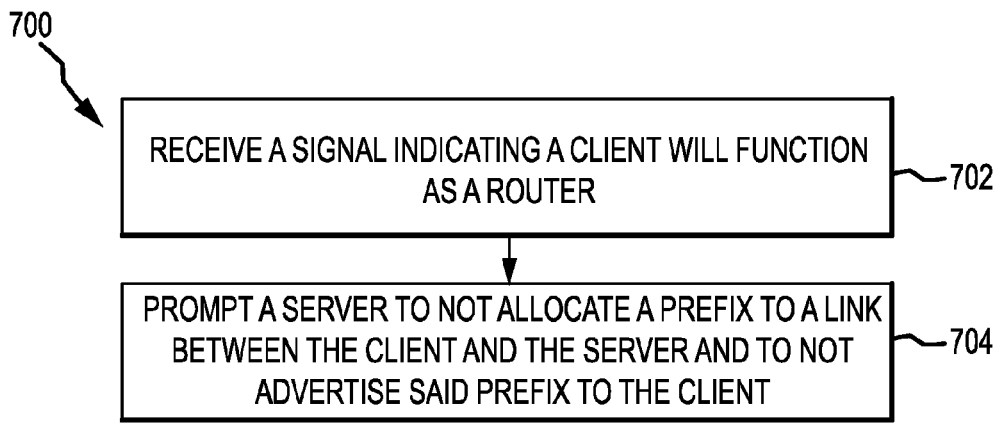
FIG. 7 illustrates a first example of a flow chart of a method of wireless communication.
Figure 8:
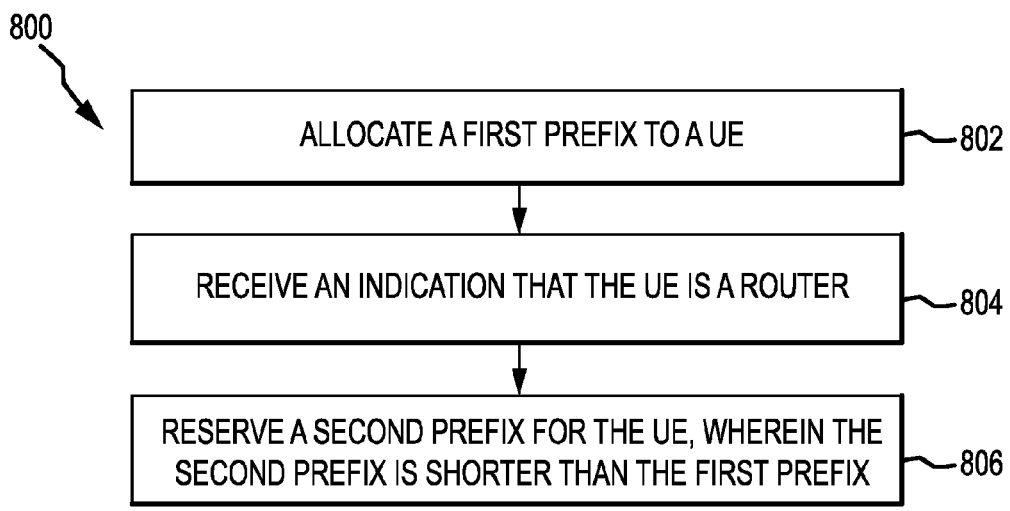
FIG. 8 illustrates a second example of a flow chart of a method of wireless communication.
Figure 9:
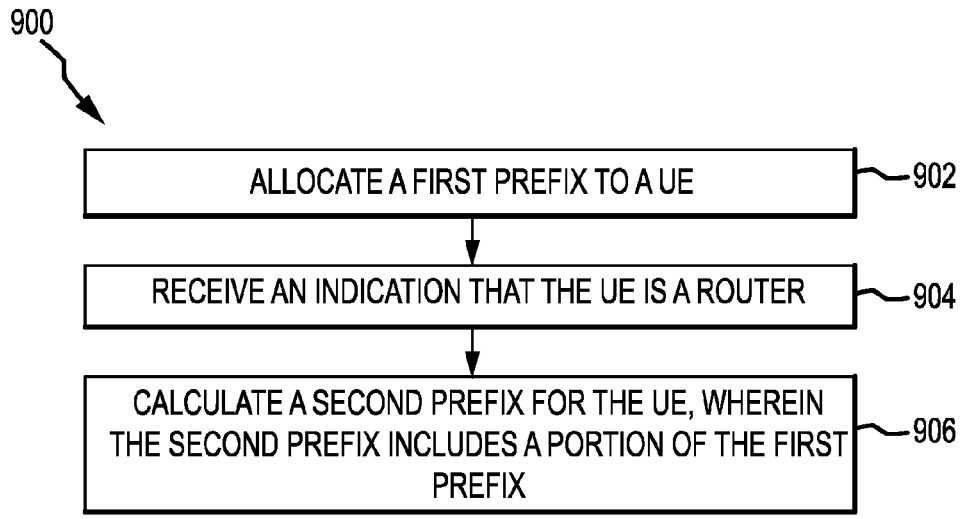
FIG. 9 illustrates a third example of a flow chart of a method of wireless communication.

FIGS. 7, 8 and 9 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a first example of a flow chart 700 of a method of wireless communication. Generally, to facilitate effective communications over a point-to-point link, a PDN gateway may seek to determine whether a UE is acting as a host or a router. A host may have a prefix allocated and advertised, while a router may have a shorter prefix allocated and may delegate prefixes to UEs associated with the router. Generally, in one aspect, a UE may request a prefix delegation (e.g. an IPv6 prefix delegation) to a PDN gateway. In response, a shorter than /64 prefix may be delegated to UE via DHCP-PD (Dynamic Host Configuration Protocol—Prefix Delegation). Such a prefix may then be subdivided by UE into longer prefixes that may be: sub-delegated via DHCP-PD to further mobile routers downstream, advertised on leaf links (/64) by sending IPv6 router Advertisements on advertising interface, etc. In another aspect, a PDN gateway may allocate a /64 IPv6 prefix to a UE and may advertise the UE on a WWAN (wireless wide area network) cellular link via an IPv6 Router Advertisement. However the UE may not need this /64 prefix since, it is a router and routers ignores router advertisements, and the UE may form global address from sub-prefixes of delegated prefixes. In both of the above described aspect, multiple prefixes are allocated to a UE acting as a router. Such allocations may overly burden networks resources.

In one aspect, receive a signal from a client to indicate the client will function as a router (702). In one example, the client is a point-to-point (PtP) client. In such an aspect, based on 3GPP Non Access Stratum (NAS) protocols, the signal may include a new Protocol Configuration Option (PCO) or Information Element (IE) for router capability. In one aspect, the signal may be received by the PDN gateway during, UE initial attach procedure, a UE requested PDN connectivity procedure, etc. Furthermore, prompt a server to not allocate a prefix to a link between the server and the client and to not advertise said prefix to the Client (704). In one example, the server is a point-to-point (PtP) server. In one aspect, also delegate a short prefix to the client, wherein the short prefix has a shorter length than the prefix. In such an aspect, based on Internet Engineering Task Force (IETF) IPv6 protocols, a PDN gateway may not allocate a prefix before it receives a router solicitation from UE or timer expires. Further, a "mobile router" UE may not send a router solicitation, but rather may send a DHCP prefix delegation request. In one aspect, the UE may send a router advertisement without prefix information when it brings up the link. And, upon receipt of an indication that the UE is to act as a router, the PDN gateway may deactivate a timer, and mark UE as router.

Figure 13:
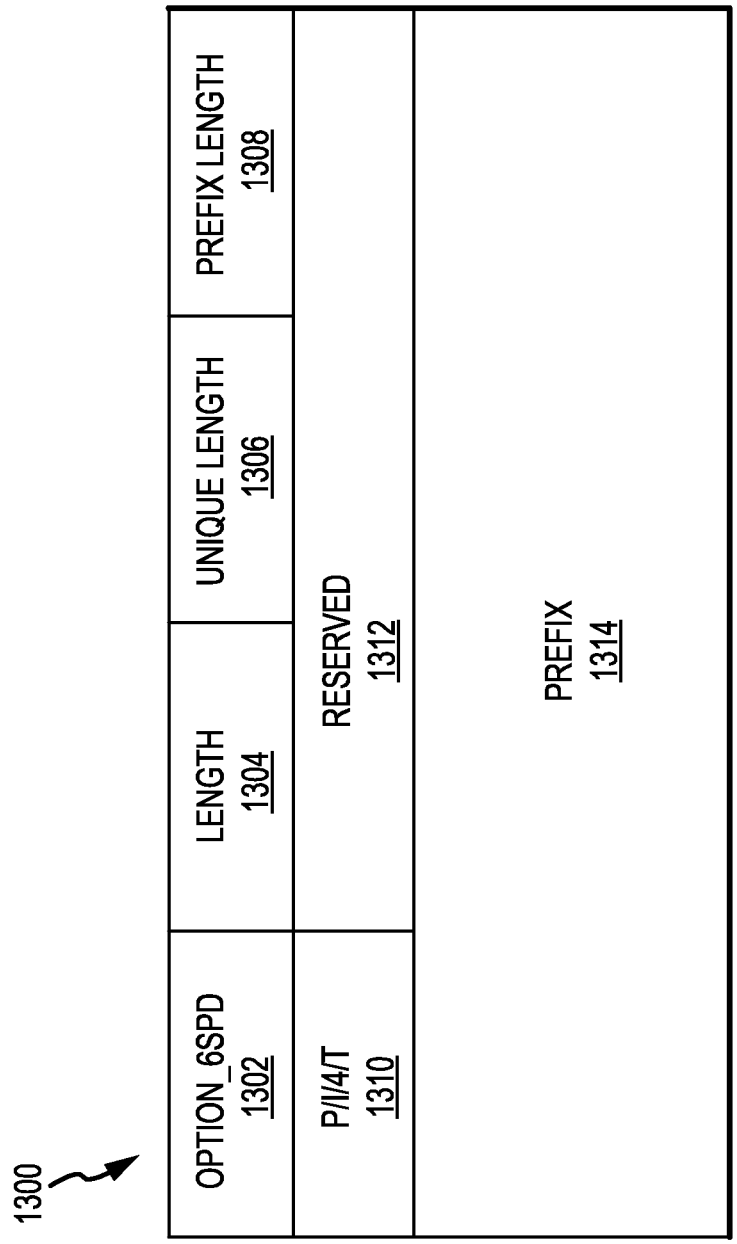
FIG. 13 illustrates an example block diagram of a prefix according to one aspect.

FIG. 8 illustrates a second example of a flow chart 800 of a method of wireless communication. Generally, to facilitate effective communications over a point-to-point link, a PDN gateway may seek to determine whether a UE is acting as a host or a router. In one aspect, an automatic and stateless IPv6 Prefix Delegation may be realized in some IPv6-only and dual-stack access networks. In such an aspect, an IPv4 address may be used with a service provider's own IPv6 address prefix to calculate delegated IPv6 prefixes. In one example, IPv6 rapid deployment (6RD) is a technique to implement IPv6 rapid deployment in an existing IPv4 infrastructure. Further, the IPv4 address used for the 6RD's calculation may be replaced with unique bits from other information sources, such as from unique /64 prefix allocated to a host or for example from the GTP Tunnel Endpoint Identifier or GRE Key. In such an aspect it may be possible to calculate the delegated, shorter than /64, prefixes from configured service provider's IPv6 prefix and from a unique data source known by the host and the network gateway. Further, as this solution may be used in IPv6-enabled networks, no IP-in-IP encapsulation may be required. Still further, due to stateless nature, this approach enables prefix delegation without mandating deployment of stateful DHCPv6 servers or AAA involvement. When the mechanism is used in deployments such 3GPP, IPv6 routing remains static and does not require dynamic updates. An example prefix configuration option is shown in FIG. 13 with the following: an option_6spd field 1302, a length field 1304, a unique length field 1306, a prefix length field 1308, a P/I/4/T field 1310, a reserved field 1312 and/or a prefix field 1314.

In one aspect, a stateless solution may be a complementary, and in some scenarios alternative, solution for stateful DHCPv6 Prefix Delegation (DHCPv6 PD). The calculated prefixes may be used similarly to how prefixes delegated with DHCPv6 PD would be used, except that lifetime of these prefixes may be bound to the lifetime of the used source of information (e.g. the /64-bit prefix of host's WAN interface or in case of GTP TEID to the lifetime of network connection). The stateless delegation may be designed to be a solution for the scenario where large number of hosts, routers, need to delegate a single and fixed, usually not very short, size of prefix.

In certain point-to-point network architectures a host may be configured with a unique /64-bit prefix. As a host has unique /64-bit prefix, it may use lowest bits of the prefix in conjunction with service provider configured common prefix. Essentially, a host may build delegated prefix similarly to 6RD, but use the unique IPv6 prefix bits instead of an IPv4 address. In one example, a lifetime of delegated prefixes may be bound to a lifetime of the unique /64 bit prefix, which usually is bound to a lifetime of layer 2 connection between the host and the network. If the host has a static /64 prefix, e.g. a host receives the same /64 prefix in a subsequent layer 2 connection established with the same network, then the delegated prefixes remain valid over reconnections (unless service provider's common prefix changes). In such an aspect, a host may: receive unique /64-bit prefix on its WAN interface, ask for service provider common prefix via DHCPv6 Information Request, combine lowest bits of /64 prefix with common prefix, learn the prefix it has been delegated, and become a router and start to advertise /64 subnet prefix(es) selected from the delegated prefix on local area network(s), or further delegates them.

In one aspect, allocate a first prefix to a UE (802). In such an aspect, when a host connects, a gateway (e.g., packet date node gateway 208) may allocate /64 prefix for the point-to-point link. In one aspect, receive an indication that the UE is a router (804). Further, reserve a second prefix for the UE, wherein the second prefix is shorter than the first prefix (806). In one such aspect, after the allocation of /64, the gateway (e.g., packet date node gateway 208) calculates delegated prefixes for newly connected host, and updates routing tables accordingly. Further, the gateway may not know which of the hosts are going to use delegated prefixes, as the delegation is stateless. As the delegated prefixes may be calculated based on the allocated /64 prefix and service provider common prefix, accounting and authorization functions may identify to which subscriber different data flows belong.

In another aspect, using an IPv4 address may be the same as 6RD, except that encapsulation is not needed if a host is provided with dual-stack network connectivity. The IPv4 address may be globally or locally unique. The used link type may be shared or point-to-point.

In one aspect, a mobile node may be attached to multiple uplink WAN connections simultaneously, in which case it may statelessly receive delegated prefixes from more than one network interface. In such case, the host may choose which, or all, of the delegated prefixes it advertises on the local area network(s). When new upstream connections are opened and statelessly delegated prefixes calculated, the host may add new prefixes to router advertisements it is sending locally. When upstream connection(s) are lost beyond recovery (e.g. if re-establishment fails), the host may send a router advertisement with preferred and valid lifetime of zero to local area network for those prefixes that no longer may be routed.

In another aspect, a /64 prefix, or single IPv6 address, may have been allocated by the Proxy Mobile IPv6 (PMIP6) Local Mobility Anchor (LMA) or (DS) MIP6 Home Agent. In such an aspect, a network or host based mobility may be provided also for the statelessly delegated prefixes, e.g. essentially providing NEMO-kind of functionality (alternatively to DHCPv6 PD based NEMO (network mobility)).

In one aspect, the lifetimes for the advertised prefixes depend on the source of information used on prefix calculation. In the case of an IPv6 prefix or IPv4 address, the advertised prefix lifetime is equal or shorter than the lifetime of the source. In the case of IID or layer 2 identifier, the advertised prefix lifetime may be bound to the IID or layer 2 identifier, i.e., be valid as long as the link is up. To enable network renumbering in case of long lived connections, the host may recheck validity of the service provider prefix daily or in apparent route failure (e.g. determined based on received Internet Control Message Protocol v6 (ICMPv6) error messages).

FIG. 9 illustrates a third example of a flow chart 900 of a method of wireless communication. In one aspect, in evolved packet core (EPC) networks every UE may be allocated a /64 prefix and similarly for General Packet Radio Services (GPRS). Further, if the UE acts as a router and support a network behind it, the UE may request a shorter prefix to be delegated to it. To support this, the EPC network may reserve a shorter prefix (e.g. a /56) for the UE even before the UE requests delegation of a prefix. A carefully planned prefix delegation model may help with minimizing the impact on the routing and policy control infrastructures. Irrespective of the length of the shorter prefix or the technique used for delegation, use of a shorter prefix may be preferable over an initial /64 prefix assigned to the UE to be used as a part of the shorter prefix intended to be delegated to the UE. An example IPv6 framed prefix is provided with reference to FIG. 14.

In one aspect, allocate a first prefix to a UE (902). In one aspect, receive an indication that the UE is a router (904). Further, calculate a second prefix for the UE, wherein the second prefix includes a portion of the first prefix (906). In one example, the allocating and calculating steps are performed by a gateway (e.g., packet date node gateway 208).

Figure 10:
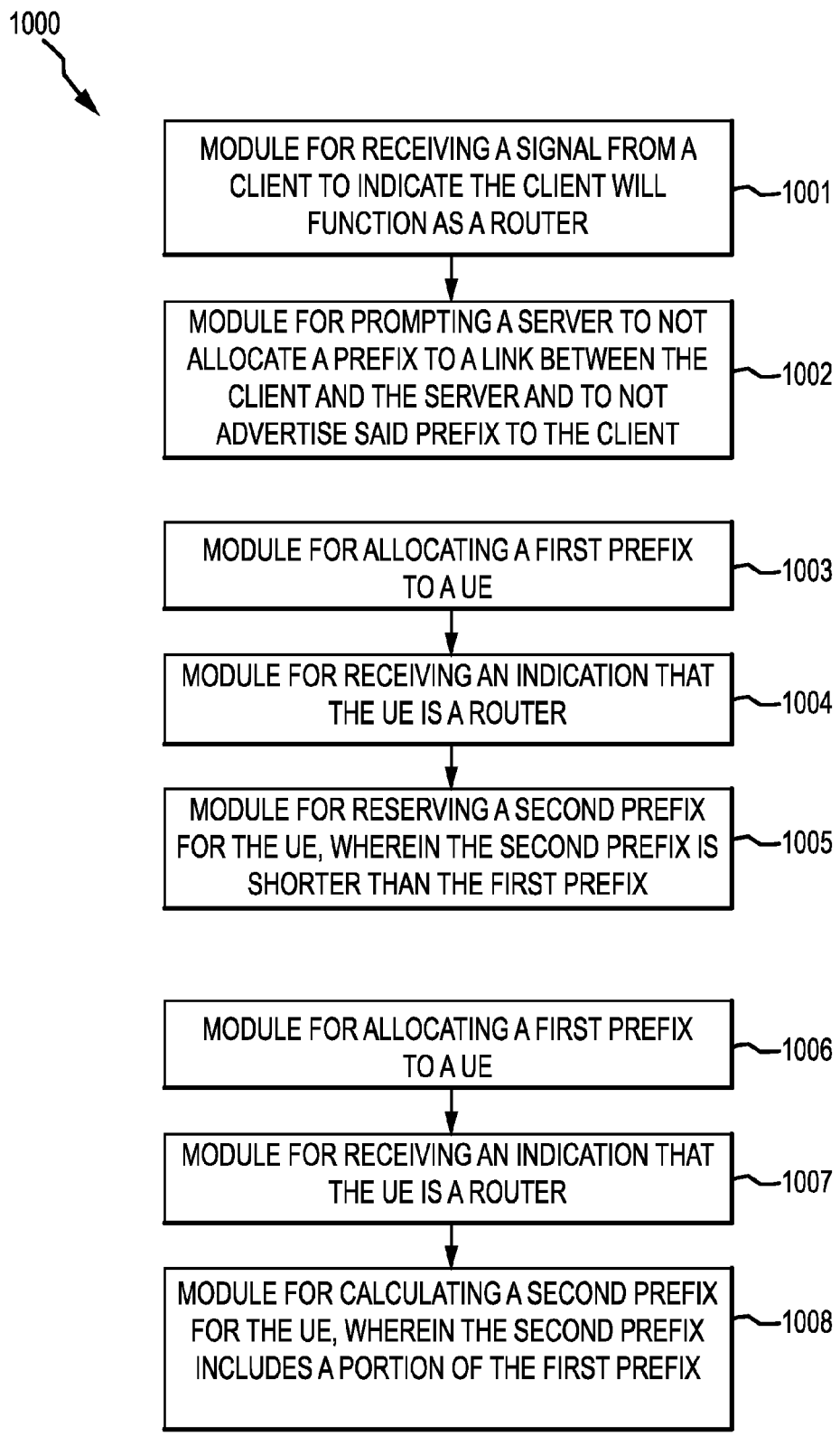
FIG. 10 illustrates a conceptual block diagram illustrating the functionality of an example apparatus in accordance with the present disclosure.

FIG. 10 illustrates a conceptual block diagram 1000 illustrating the functionality of an example apparatus in accordance with the present disclosure. In a first aspect, the example apparatus is the processing system 100 (see FIG. 1) which may include a module 1001 that receives a signal from a client to indicate the client will function as a router, and a module 1002 that prompts a server to not allocate a prefix to a link between the client and the server and to not advertise said prefix to the client. In one aspect, also delegate a short prefix to the client, wherein the short prefix has a shorter length than the prefix. In one example, the module 1001 includes an antenna and the module 1002 includes a processor. In one example, the client is a point-to-point (PtP) client and the server is a point-to-point (PtP) server.

In a second aspect, the example apparatus may include a module 1003 that allocates a first prefix to a UE, a module 1004 that receives an indication that the UE is a router, and a module 1005 that reserves a second prefix for the UE, wherein the second prefix is shorter than the first prefix. In one example, a gateway includes modules 1003, 1004 and 1005.

In a third aspect, the example apparatus may include a module 1006 that allocates a first prefix to a first UE, a module 1007 that receives an indication that the UE is a router, and a module 1008 that calculates a second prefix for a second UE, wherein the second prefix includes a portion of the first prefix. In one example, a gateway includes modules 1006, 1007 and 1008.

In one configuration, the example apparatus includes means for receiving a signal from a point to point (PtP) client to indicate the PtP client will function as a router. In addition, the example apparatus includes means for prompting a PtP server to not assign (i.e., not allocate) a prefix to a link between the PtP server and the PtP client and to not advertise said prefix to the PtP Client. The aforementioned means is the processing system 114 (see FIG. 1) configured to perform the functions recited by the aforementioned means. As described supra, the processing system 100 is part of the network component 610 which includes the TX Processor 616 and the RX Processor 670 (see FIG. 6). As such, in one configuration, the aforementioned means may be the TX Processor 616 and the RX Processor 670 configured to perform the functions recited by the aforementioned means.

It is understood that the specific order or hierarchy of steps in the processes disclosed herein is an illustration of example approaches. Based upon design preferences, it is understood that the specific order or hierarchy of steps in the processes may be rearranged. The accompanying method claims present elements of the various steps in a sample order, and are not meant to be limited to the specific order or hierarchy presented.

Figure 11:
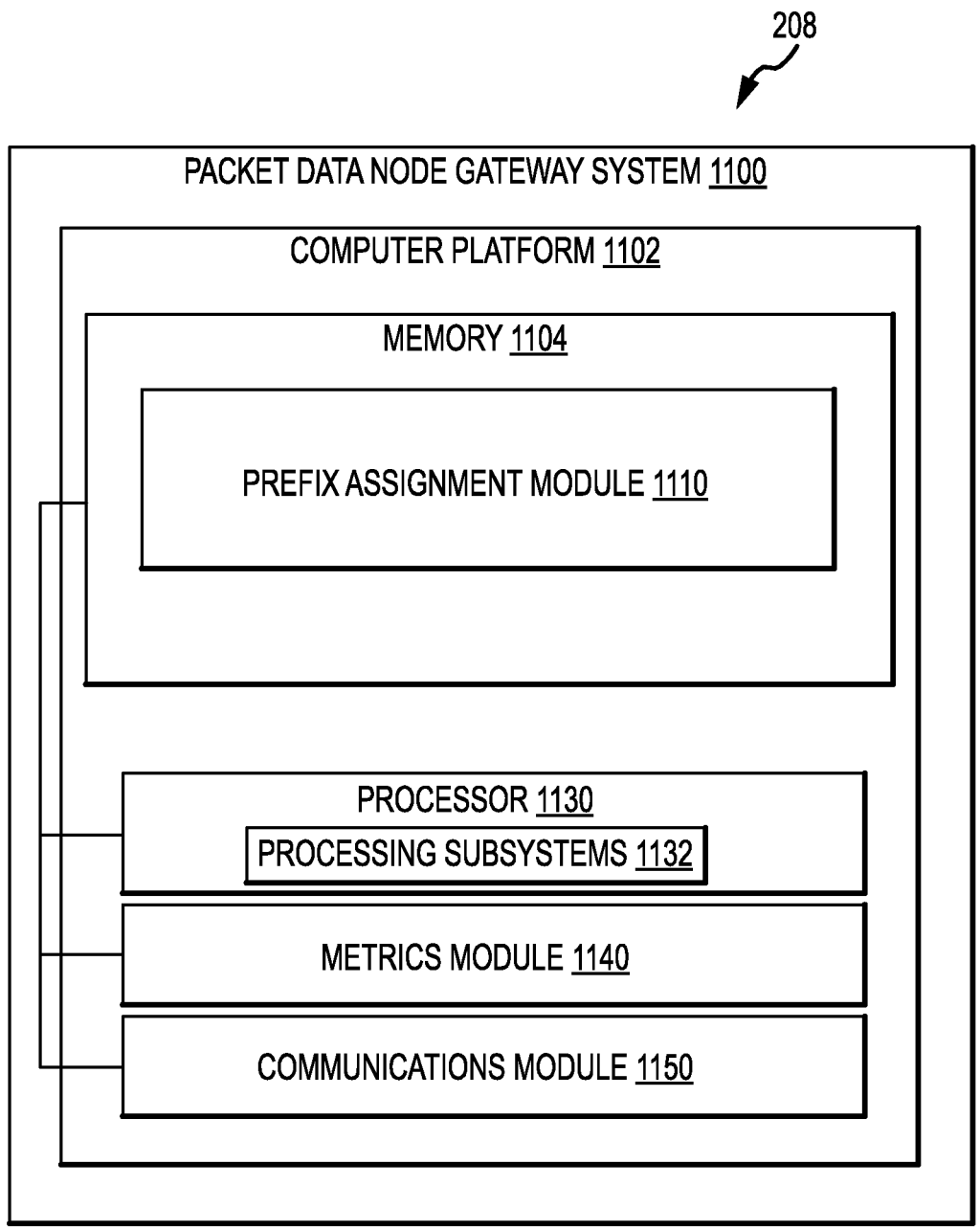
FIG. 11 illustrates an example block diagram of a prefix assignment system according to one aspect.

FIG. 11 illustrates an example block diagram of a prefix assignment system according to one aspect. With reference to FIG. 11, illustrated is a detailed block diagram of packet data node (PDN) gateway system 1100, such as PDN gateway 208 depicted in FIG. 2. PDN gateway system 1100 may include at least one of any type of hardware, server, personal computer, mini-computer, mainframe computer, or any computing device either special purpose or general computing device. Further, the modules and applications described herein as being operated on or executed by PDN gateway system 1100 may be executed entirely on a single network device, as shown in FIG. 11, or alternatively, in other aspects, separate servers, databases or computer devices may work in concert to provide data in usable formats to parties, and/or to provide a separate layer of control in the data flow between UEs 214, node Bs (e.g., eNodeBs) 212, and the modules and applications executed by PDN gateway system 1100.

PDN gateway system 1100 includes computer platform 1102 that can transmit and receive data across wired and wireless networks, and that can execute routines and applications. Computer platform 1102 includes a memory 1104, which may include volatile and nonvolatile memory such as read-only and/or random-access memory (ROM and RAM), EPROM, EEPROM, flash cards, or any memory common to computer platforms. Further, memory 1104 may include one or more flash memory cells, or may be any secondary or tertiary storage device, such as magnetic media, optical media, tape, or soft or hard disk. Still further, computer platform 1102 may also include a processor 1130, which may be an application-specific integrated circuit (ASIC), or other chipset, logic circuit, or other data processing device. Processor 1130 may include various processing subsystems 1132 embodied in hardware, firmware, software, and combinations thereof, that enable the functionality of prefix assignment module 1110 and the operability of the network device on a wired or wireless network.

As illustrated, computer platform 1102 further includes communications module 1150 embodied in hardware, firmware, software, and combinations thereof that enables communications among the various components of PDN gateway system 1100, as well as between PDN gateway system 1100 and node Bs 212 (e.g., eNodeBs). Communication module 1150 may include the requisite hardware, firmware, software and/or combinations thereof for establishing a wireless communication connection. According to described aspects, communication module 1150 may include hardware, firmware and/or software to facilitate wireless broadcast, multicast and/or unicast communication of requested cell, node B, eNodeB, UE, etc.

Computer platform 1102 further includes metrics module 1140, embodied in hardware, firmware, software, and combinations thereof, that enables metrics received from node Bs 212 (e.g., eNodeBs) corresponding to, among other things, data communicated from UEs 214. In one aspect, PDN gateway system 1100 may analyze data received through metrics module 1140 monitor network health, capacity, usage, routing requests, etc. For example, if the metrics module 1140 returns data indicating that one of the UEs 214 intents to act as a router, then the PDN gateway system 1100 may allocate appropriate resources to the UE 214.

Memory 1104 of PDN gateway system 1100 includes prefix assignment module 1110 operable for determining prefix allocations based at least in part on whether a requesting UE intents to act as a router or host.

Figure 12:
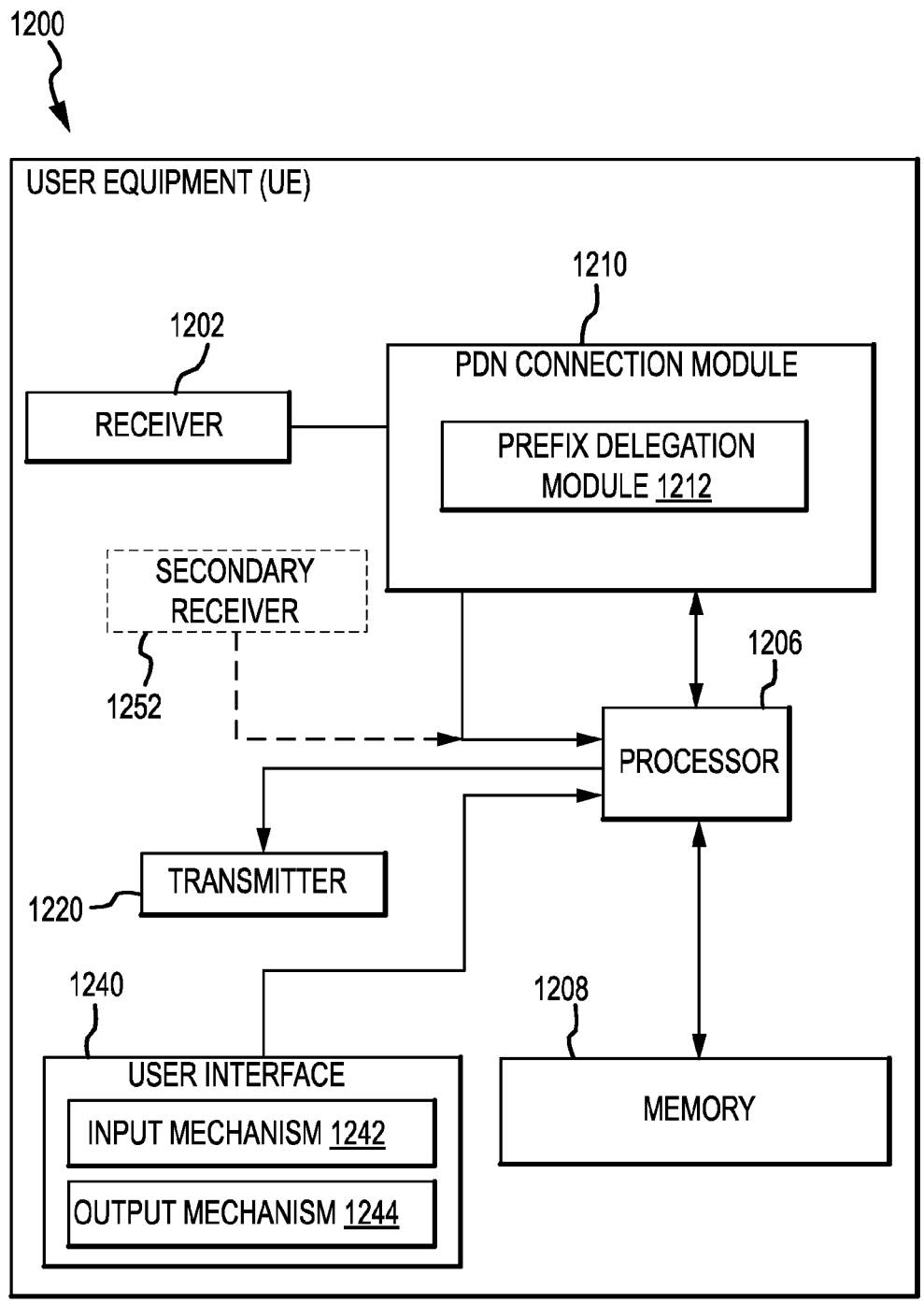
FIG. 12 illustrates an example block diagram of a wireless communications device configured to facilitate prefix allocation and advertisement or delegation according to one aspect.

FIG. 12 illustrates an example block diagram 1200 of a wireless communications device configured to facilitate prefix allocation and advertisement or delegation according to one aspect. With reference now to FIG. 12, an illustration of a user equipment (UE) 1200 (e.g. a client device, wireless communications device (WCD), etc.) that is able to act as a router or host in a point-to-point link is presented. UE 1200 includes receiver 1202 that receives one or more signals from, for instance, one or more receive antennas (not shown), performs typical actions on (e.g., filters, amplifies, downconverts, etc.) the received signal, and digitizes the conditioned signal to obtain samples. Receiver 1202 may further include an oscillator that may provide a carrier frequency for demodulation of the received signal and a demodulator that may demodulate received symbols and provide them to processor 1206 for channel estimation. In one aspect, UE 1200 may further include secondary receiver 1252 and may receive additional channels of information.

Processor 1206 may be a processor dedicated to analyzing information received by receiver 1202 and/or generating information for transmission by one or more transmitters 1220 (for ease of illustration, only one transmitter is shown). Processor 1206 may be a processor that controls one or more components of UE 1200, and/or a processor that both analyzes information received by receiver 1202 and/or secondary receiver 1252, generates information for transmission by transmitter 1220 for transmission on one or more transmitting antennas (not shown), and controls one or more components of UE 1200.

UE 1200 may additionally include a memory 1208 that is operatively coupled to processor 1206 and that may store data to be transmitted, received data, information related to available channels, data associated with analyzed signal and/or interference strength information related to an assigned channel, power, rate, or the like, and/or any other suitable information for estimating a channel and/or communicating via the channel. Memory 1208 may additionally store protocols and/or algorithms associated with estimating and/or utilizing a channel (e.g., performance based, capacity based, etc.).

It will be appreciated that memory 1208 described herein may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), and/or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1208, as described herein, is intended to include, without being limited to, these and any other suitable types of memory.

In one example, UE 1200 includes a PDN connection module 1210 which may be operable to enable the UE 1200 to act as a router or host in a point-to-point link, such as described with reference to FIGS. 7, 8 and 9. In one such aspect, the PDN connection module 1210 may include prefix delegation 1212 which is operable to allocate prefixes to UEs seeking access to a point-to-point link through the UE 1200 with the UE 1200 acting as a router.

Additionally, UE 1200 may include user interface 1240. User interface 1240 may include input mechanisms 1242 for generating inputs into UE 1200, and output mechanism 1244 for generating information for consumption by the user of UE 1200. For example, input mechanism 1242 may include a mechanism such as a key or keyboard, a mouse, a touch-screen display, a microphone, etc. And, for example, output mechanism 1244 may include a display, an audio speaker, a haptic feedback mechanism, a Personal Area Network (PAN) transceiver, etc. In one example, output mechanism 1244 may include a display operable to present content that is in image or video format, or an audio speaker to present content that is in an audio format.

In one aspect, there are numerous IPv6 addresses and a large number of customers can be satisfied with reasonably long delegated prefixes. With stateless delegation, explicit signaling for prefix delegation purposes between large numbers of (unmanaged) customer equipment and operator's DHCPv6 servers may be avoided. The operator remains in control of prefix delegation by using dedicated access point names (APNs) (cellular network case), by not providing service provider prefix on request (e.g. determined by device identifiers), and by enforcing communications with firewalls.

Figure 14:
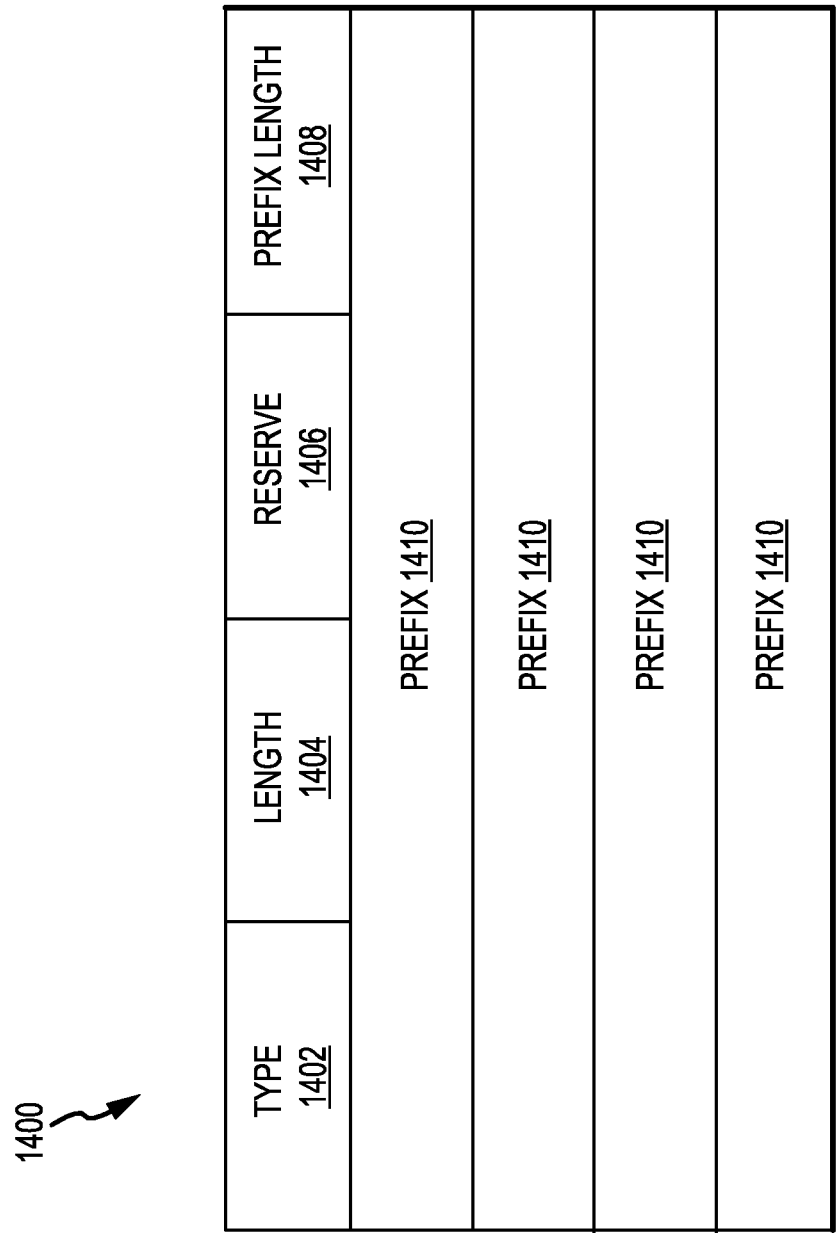
FIG. 14 illustrates an example block diagram of a framed prefix according to one aspect.

FIG. 14 illustrates an example block diagram of a framed prefix 1400 according to one aspect. Generally, the Policy & Charging Control Architecture (PCC) may provide network control regarding the service data flow detection, gating & QoS towards the Policy Control Enforcement Function (PCEF) and the Bearer Binding and Event Reporting Function (BBERF). In addition PCC may also provide network control of flow based charging towards the PCEF. An objective of the PCC may be to interconnect the signaling plane with the data plane to provide policy, QoS control and charging. To achieve the interconnection PCC may perform session binding. Session binding may use a match between the application function (AF) session (Rx signaling interface) and IP-CAN (Internet Protocol Connectivity Access Network) parameters. For an IPv6 session the IP-CAN parameter containing the UE IPv6 prefix is the DIAMETER Framed-IPv6-Prefix AVP (attribute value pair) defines framed IPv6. An IP-CAN Session may contain only one Framed-IPv6-Prefix AVP.

In one aspect a Framed-IPv6-Prefix AVP may include description, type 1402, length 1404, reserved 1406, prefix length 1408, and prefix 1410 fields. In one aspect, a description may indicate an IPv6 prefix (and corresponding route) to be configured for the user. The description may be used in Access-Accept packets, and may appear multiple times. The description may be used in an Access-Request packet as a hint by the Non-Access Stratum (NAS) to the server that it would prefer these prefix(es), but the server is not required to honor the hint. Since it may be assumed that the NAS may plumb a route corresponding to the prefix, it may not be necessary for the server to also send a Framed-IPv6-Route attribute for the same prefix. Type 1402 field may indicate "97" for a Framed-IPv6-Prefix. Length 1404 field may be at least 4 and no larger than 20 bits long. In one aspect, reserved 1406 field (which is reserved and must be present) is always set to zero. Prefix length 1408 field may indicate the length of the prefix, in bits (e.g. at least 0 and no larger than 128). Prefix 1410 field may include up to 16 octets in length where bits outside of the Prefix-Length 1408, if included, may be zero.

In one aspect, the original Prefix-Length 1408 value (contained after an initial UE PDN connection is established) may be changed to a shorter prefix if obtained by the UE using prefix delegation mechanism. If the original IPv6 prefix is part of the shorter delegated IPv6 prefix, updating the Prefix-Length 1208 field in the Framed-IPv6-Prefix AVP 1200 may enable successful session binding for all addresses contained within the delegated prefix.

In one example, a UE may request IPv6 prefix using existing 3GPP defined procedures. As an exception from existing mechanisms there is a reservation for a /56 IPv6 prefix for the requesting UE, possibly configured per Access Point Name (APN) for the subscriber. However, this step does not change the existing PDN Connection setup signaling. SLAAC (stateless address auto configuration) returns "the last/highest" or "the first/lowest" /64 IPv6 prefix of the reserved prefix using existing 3GPP defined procedures. The prefix may be extended from 2001:db8:4000:FFFF::/64 to 2001:db8:4000:FF00::/56 by using DHCPv6 PD. Thereafter PDN gateway may perform IP-CAN session modification. UE uplink subnet is kept as the initial received prefix 2001:db8:4000:FFFF:164. Further, available /64 interface subnets are 2001:db8:4000:FF00-FFFE::/64 with a first available subnet for UE downlink interfaces 2001:db8:4000: FF00::/64 and a last available subnet for UE downlink interfaces 2001:db8:4000:FFFE::/64. As such, if the IP-CAN session Framed-IPv6-Prefix AVP Length field 1208 is modified to represent a shorter prefix (from 64 to 56) a match may be made to all /64 that are included in the shorter prefix including the UE initial /64 received using existing 3GPP defined procedures. In one aspect, such an example may have minimal impact on the PCC if one a) keeps current restrictions on only one IPv4 address and only one IPv6 prefix for a single connection (PDP Context/PDN Connection); b) allows a shorter prefix length for a single connection (PDP Context/PDN Connection); and c) adds possibility to adjust prefix length within a connection.

In one aspect, the IPv6 Prefix Options for DHCPv6 document specifies a mechanism for using DHCPv6 for delegating prefixes from a delegating router to a requesting router. The mechanism may be well suited for use in EPC networks but may have a restriction that limits its usage. One example restriction is that the requesting router must not assign any delegated prefixes or subnets from the delegated prefix(es) to the link through which it received the DHCP message from the delegating router. This restriction does not allow the UE to use a /64 out of the delegated prefix on the interface where it received the delegation. With this restriction, two different prefixes need to be allocated for each UE (one /64 and one shorter) which may cause a significant impact on the routing and policy infrastructures.

In one example, the disclosed DHCPv6 prefix delegation technique may be used in 3GPP EPC networks. In one aspect, where the UE is only acting as a 'bridge-like' modem (e.g., for a notebook where the host IP stack is running), the actual prefix delegation request may originate from the notebook IP stack.

One skilled in the art would understand that the steps disclosed in the example flow diagrams in FIGS. 7, 8 and 9 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 15:
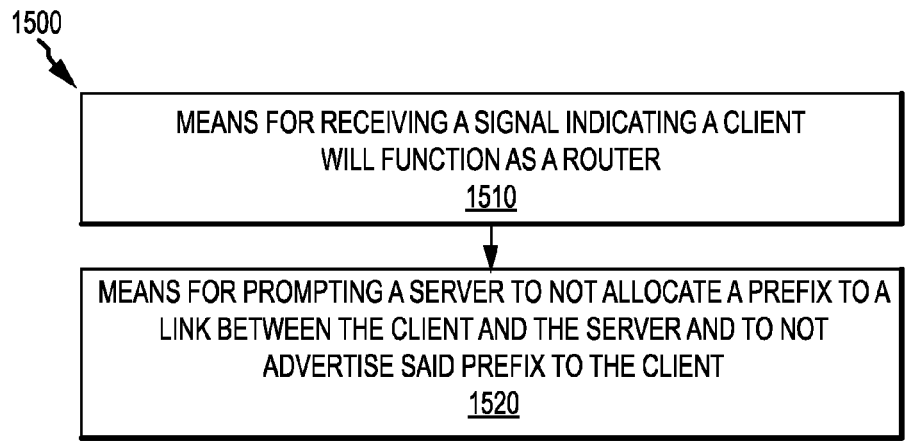
FIG. 15 illustrates an example of a first device suitable for facilitating prefix allocation and advertisement or delegation.

FIG. 15 illustrates an example of a first device 1500 suitable for facilitating prefix allocation and advertisement or delegation. In one aspect, the device 1500 is implemented by at least one processor comprising one or more modules configured to provide different aspects of facilitating prefix allocation and advertisement or delegation as described herein in blocks 1510 and 1520. For example, each module includes hardware, firmware, software, or any combination thereof. In one aspect, the device 1500 is also implemented by at least one memory in communication with the at least one processor.

Figure 16:
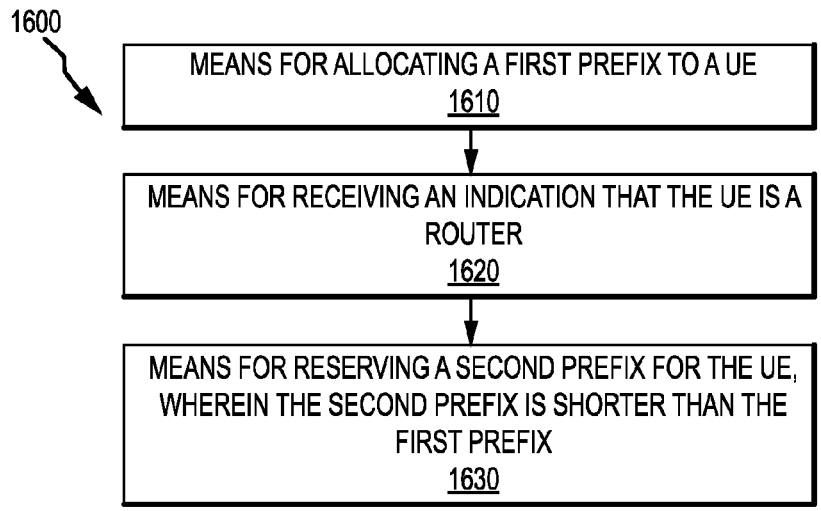
FIG. 16 illustrates an example of a second device suitable for facilitating prefix allocation and advertisement or delegation.

FIG. 16 illustrates an example of a second device 1600 suitable for facilitating prefix allocation and advertisement or delegation. In one aspect, the device 1600 is implemented by at least one processor comprising one or more modules configured to provide different aspects of facilitating prefix allocation and advertisement or delegation as described herein in blocks 1610, 1620 and 1630. For example, each module includes hardware, firmware, software, or any combination thereof. In one aspect, the device 1600 is also implemented by at least one memory in communication with the at least one processor.

Figure 17:
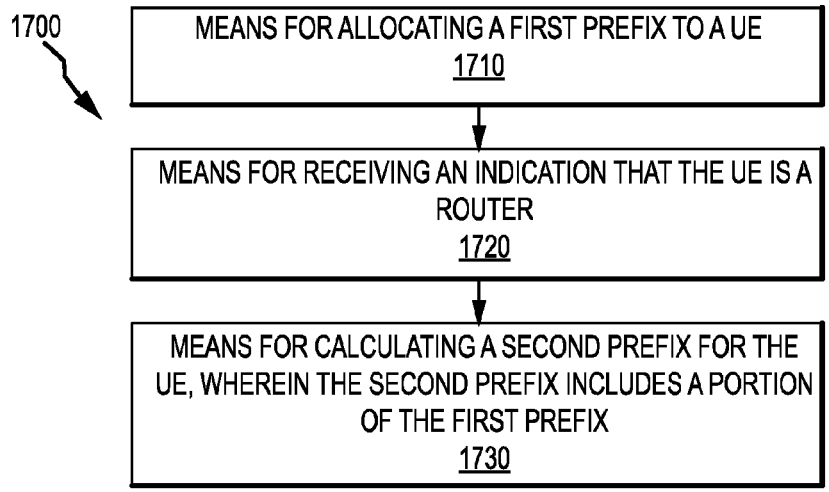
FIG. 17 illustrates an example of a third device suitable for facilitating prefix allocation and advertisement or delegation.

FIG. 17 illustrates an example of a third device 1700 suitable for facilitating prefix allocation and advertisement or delegation. In one aspect, the device 1700 is implemented by at least one processor comprising one or more modules configured to provide different aspects of facilitating prefix allocation and advertisement or delegation as described herein in blocks 1710, 1720 and 1730. For example, each module includes hardware, firmware, software, or any combination thereof. In one aspect, the device 1700 is also implemented by at least one memory in communication with the at least one processor.

Figure 18:
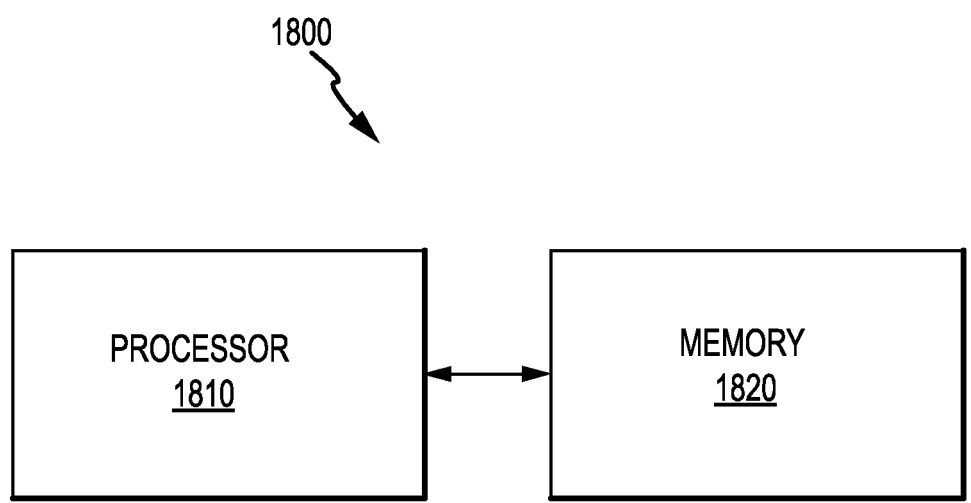
FIG. 18 illustrates an example of a device 1800 comprising a processor 1810 in communication with a memory 1820 for executing the processes for facilitating prefix allocation and advertisement or delegation.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 18 illustrates an example of a device 1800 comprising a processor 1810 in communication with a memory 1820 for executing the processes for facilitating prefix allocation and advertisement or delegation. In one example, the device 1800 is used to implement the algorithms illustrated in FIGS. 7, 8 and 9. In one aspect, the memory 1820 is located within the processor 1810. In another aspect, the memory 1820 is external to the processor 1810. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for allocating prefixes in a wireless communication system, comprising:
    activating a timer at a server, the timer including a timer duration during which prefix allocations are reduced to reduce a burden on network resources, wherein the server is configured to allocate a prefix after:
        the timer duration expires, or
        a signal is received from a client to indicate that the client will function as a router, wherein the signal includes a router capability indication and is received during a user equipment (UE) initial attach procedure; and
    receiving the signal from the client that indicates that the client will function as a router, and in response to receiving the signal:
        deactivating the timer,
        prompting the server to not allocate a prefix to a link between the server and the client, and
        prompting the server to not advertise the prefix to the client.

2. The method of claim 1, wherein the signal further includes at least one of the following:
    a router solicitation; or
    a prefix delegation request.

3. The method of claim 1, wherein the server is one of the following: a packet data serving node (PDSN), a gateway General Packet Radio Services (GPRS) support node (GGSN) or a packet data node (PDN) gateway (PGW).

4. The method of claim 3, wherein the client is a 3GPP user equipment (UE).

5. The method of claim 4, wherein the signal is further received during a UE requested PDN connectivity procedure.

6. The method of claim 1, wherein the wireless communication system is associated with an IEEE 802.16/WiMax network or a 3GPP2 network.

7. The method of claim 1, wherein the signal includes a new Protocol Configuration Option (PCO) or Information Element (IE) for router capability based on a 3GPP Non Access Stratum (NAS) protocol.

8. The method of claim 1, wherein the prompting is based on an Internet Engineering Task Force (IETF) IPv6 protocol.

9. The method of claim 1, wherein the signal is received before the server has advertised a prefix to the client.

10. An apparatus for allocating prefixes in a wireless communication system, comprising:
   means for activating a timer at a server, the timer including a timer duration during which prefix allocations are reduced to reduce a burden on network resources, wherein the server is configured to allocate a prefix after:
      the timer duration expires, or
      a signal is received from a client to indicate that the client will function as a router, wherein the signal includes a router capability indication and is received during a user equipment (UE) initial attach procedure; and
   means for receiving the signal from the client that indicates that the client will function as a router, and in response to receiving the signal:
      the means for activating the timer being configured to deactivate the timer,
      a means for prompting the server being configured to prompt the server to not allocate a prefix to a link between the server and the client,
      and the means for prompting the server further being configured to prompt the server to not advertise the prefix to the client.

11. The apparatus of claim 10, wherein the signal further includes at least one of the following:
   a router solicitation; or
   a prefix delegation request.

12. The apparatus of claim 10, wherein the server is one of the following: a packet data serving node (PDSN), a gateway General Packet Radio Services (GPRS) support node (GGSN) or a packet data node (PDN) gateway (PGW).

13. The apparatus of claim 10, wherein the client is a 3GPP user equipment (UE).

14. The apparatus of claim 13, wherein the signal is received during a UE requested PDN connectivity procedure.

15. The apparatus of claim 10, wherein the wireless communication system is associated with an IEEE 802.16/WiMax network or a 3GPP2 network.

16. The apparatus of claim 10, wherein the signal may include a new Protocol Configuration Option (PCO) or Information Element (IE) for router capability based on a 3GPP Non Access Stratum (NAS) protocol.

17. The apparatus of claim 10, wherein the means for prompting is based on an Internet Engineering Task Force (IETF) IPv6 protocol.

18. An apparatus for allocating prefixes in a wireless communication system, comprising:
   a processor;
   an antenna configured to receive a signal from a client to indicate that the client will function as a router;
   a server, the server including a timer including a timer duration during which prefix allocations are reduced to reduce a burden on network resources, the server being configured to activate the timer and to allocate a prefix after:
      the timer duration expires, or
      the antenna receives the signal from the client to indicate that the client will function as a router, wherein the signal includes a router capability indication and is received during a user equipment (UE) initial attach procedure, and
   in response to receiving the signal:
      the server being further configured to deactivate the timer,
      the processor being configured to prompt the server to not allocate a prefix to a link between the server and the client, and
      the processor being further configured to prompt the server to not advertise the prefix to the client.

19. The apparatus of claim 18, wherein the signal further includes at least one of the following:
   a router solicitation; or
   a prefix delegation request.

20. The apparatus of claim 18, wherein the server is one of the following: a packet data serving node (PDSN), a gateway General Packet Radio Services (GPRS) support node (GGSN) or a packet data node (PDN) gateway (PGW).

21. The apparatus of claim 20, wherein the client is a 3GPP user equipment (UE).

22. The apparatus of claim 21, wherein the signal is further received during a UE requested PDN connectivity procedure.

23. The apparatus of claim 18, wherein the wireless communication system is associated with an IEEE 802.16/WiMax network or a 3GPP2 network.

24. The apparatus of claim 18, wherein the signal includes a new Protocol Configuration Option (PCO) or Information Element (IE) for router capability based on a 3GPP Non Access Stratum (NAS) protocol.

25. The apparatus of claim 18, wherein the processor is configured to prompt the server based on an Internet Engineering Task Force (IETF) IPv6 protocol.

26. A non-transitory computer program product, comprising:
   a computer-readable medium comprising:
   codes for causing a computer to activate a timer at a server, the timer including a timer duration during which prefix allocations are reduced to reduce a burden on network resources, wherein the code causes the computer to allocate a prefix after:
      the timer duration expires, or
      a signal is received from a client to indicate that the client will function as a router, wherein the signal includes a router capability indication and is received during a user equipment (UE) initial attach procedure; and
   code for causing the computer to receive the signal from the client that indicates that the client will function as a router, and in response to receiving the signal, the code causing the computer to:
      deactivate the timer,
      prompt the server to not allocate a prefix to a link between the server and the client, and
      prompt the server to not advertise the prefix to the client.

* * * * *